United States Patent
Tang

(10) Patent No.: US 11,265,063 B2
(45) Date of Patent: Mar. 1, 2022

(54) WIRELESS COMMUNICATION METHOD, NETWORK DEVICE, AND TERMINAL DEVICE

(71) Applicant: HUAWEI TECHNOLOGIES CO., LTD., Guangdong (CN)

(72) Inventor: Xiaoyong Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/578,534

(22) Filed: Sep. 23, 2019

(65) Prior Publication Data

US 2020/0021351 A1    Jan. 16, 2020

Related U.S. Application Data

(63) Continuation of application No. PCT/CN2018/085504, filed on May 3, 2018.

(30) Foreign Application Priority Data

May 5, 2017 (CN) .......................... 201710313541.3

(51) Int. Cl.
*H04W 72/04* (2009.01)
*H04B 7/06* (2006.01)
*H04L 5/00* (2006.01)
*H04W 16/28* (2009.01)

(52) U.S. Cl.
CPC ......... *H04B 7/0695* (2013.01); *H04B 7/0617* (2013.01); *H04L 5/0094* (2013.01); *H04W 16/28* (2013.01); *H04W 72/046* (2013.01)

(58) Field of Classification Search
CPC ... H04B 7/0695; H04L 5/0094; H04W 72/046
See application file for complete search history.

(56) References Cited

U.S. PATENT DOCUMENTS

| | | | |
|---|---|---|---|
| 2015/0382334 A1 | 12/2015 | El Ayach et al. | |
| 2017/0222693 A1 | 8/2017 | Shen et al. | |
| 2017/0373740 A1* | 12/2017 | Guo | H04L 5/0028 |
| 2020/0059398 A1* | 2/2020 | Pan | H04W 72/0413 |
| 2020/0136708 A1* | 4/2020 | Pan | H04L 5/0051 |

FOREIGN PATENT DOCUMENTS

| | | |
|---|---|---|
| CN | 106465233 A | 2/2017 |
| WO | 2016013608 A1 | 1/2016 |
| WO | 2016086144 A1 | 6/2016 |

OTHER PUBLICATIONS

Huawei et al., "Configuration of CSI-RS for beam management," 3GPP TSG RAN WG1 Meeting #88, R1-1701689; Athens, Greece, Feb. 13-17, 2017, 6 pages.

(Continued)

*Primary Examiner* — Fahmida S Chowdhury
(74) *Attorney, Agent, or Firm* — Fish & Richardson P.C.

(57) ABSTRACT

The present disclosure relates to wireless communication methods, network devices, and terminal devices. One example method includes receiving, by a terminal device, configuration information sent by a network device, where the configuration information is used to indicate a beam sweeping type, and determining, by the terminal device, the beam sweeping type based on the configuration information.

18 Claims, 4 Drawing Sheets

(56) References Cited

OTHER PUBLICATIONS

Huawei et al., "CSI-RS design for beam management," 3GPP TSG RAN WG1 Meeting #88bis, R1-1704235; Spokane, USA, Apr. 3-7, 2017, 10 pages.
Nokia et al., "On CSI-RS Design for DL Beam Management," 3GPP TSG RAN WG1 NR 88 bis, R1-1705969; Spokane, WA, USA, Apr. 3-7, 2017, 14 pages.
PCT International Search Report and Written Opinion issued in International Application No. PCT/CN2018/085504 dated Jul. 27, 2018, 17 pages (with English translation).
EPO Partial Supplementary European Search Report issued in European Application No. 18794819.5 dated Jan. 7, 2020, 14 pages.

\* cited by examiner

WIRELESS COMMUNICATION METHOD, NETWORK DEVICE, AND TERMINAL DEVICE

CROSS-REFERENCE TO RELATED APPLICATIONS

This application is a continuation of International Application No. PCT/CN2018/085504, filed on May 3, 2018, which claims priority to Chinese Patent Application No. 201710313541.3, filed on May 5, 2017. The disclosures of the aforementioned applications are hereby incorporated by reference in their entireties.

TECHNICAL FIELD

This application relates to the communications field, and more specifically, to a wireless communication method, a network device, and a terminal device.

BACKGROUND

Deployment of 2G/3G/4G networks results in an increasing shortage of wireless frequency spectrum resources. Thanks to abundant frequency resources, a high frequency band (with a carrier frequency greater than 6 GHz) can not only resolve a shortage of spectrum resources, but also can markedly increase a throughput of a cellular network; the high frequency band has become a key 5G research object. However, a higher communication frequency may cause a larger path loss of a signal in transmission space. To overcome a large signal propagation loss, an antenna array is applied to an existing high frequency system. In an existing technology, a narrower send or receive beam is mainly used to obtain a higher beamforming or array gain, thereby increasing received power or a received signal-to-noise ratio of the signal.

After a narrow beam is used on a network device side or a terminal device side for communication, because of user movement, body whirling, blocking by an obstacle, and the like, both an angle of arrival and an angle of departure of a wireless signal may be changed, causing a mismatch between a beam transmission direction and a beam receiving direction. Consequently, a higher beamforming gain cannot be obtained, resulting in communication interruption. In a propagation environment with rich scattering, there may be a plurality of receive beam-transmit beam pairs used for information transmission between the network device and the terminal device.

Therefore, how to coordinate a beam sweeping manner between the network device and the terminal device to perform channel measurement on N beam pairs and provide a feedback is an issue that needs to be resolved urgently.

SUMMARY

This application provides a wireless communication method, to resolve an issue of how to perform beam sweeping in a plurality of beam pairs to increase a beamforming gain and improve communication quality, and to reduce signaling overheads by determining a beam sweeping type by using configuration information.

According to a first aspect, a wireless communication method is provided. The method includes: receiving, by a terminal device, configuration information sent by a network device, where the configuration information is used to indicate a beam sweeping type; and determining, by the terminal device, the beam sweeping type based on the configuration information.

Therefore, the terminal device determines the beam sweeping type based on the configuration information that is used to indicate the beam sweeping type and that is sent by the network device, to resolve an issue of how to perform beam sweeping in a plurality of beam pairs to increase a beamforming gain and improve communication quality, and to reduce signaling overheads by determining a beam sweeping type by using configuration information.

Optionally, in an implementation of the first aspect, the determining the beam sweeping type based on the configuration information includes:
determining the beam sweeping type based on the configuration information and information about a correspondence between the configuration information and the beam sweeping type.

Optionally, in an implementation of the first aspect, the terminal device receives the information, about the correspondence between the configuration information and the beam sweeping type, sent by the network device, or predefines the information about the correspondence between the configuration information and the beam sweeping type.

Optionally, in an implementation of the first aspect, the configuration information is at least one type of the following information: resource set index information, resource setting index information, report content, quasi co-location QCL information, measurement setting index information, resource configuration index information, an interleaved frequency division multiple access IFDMA repetition factor (RPF) parameter, and a subcarrier spacing parameter.

In this case, based on the correspondence between the configuration information and the beam sweeping type, the terminal device determines the beam sweeping type by using the configuration information and the correspondence between the configuration information and the beam sweeping type. This can reduce signaling overheads.

Optionally, in an implementation of the first aspect, the beam sweeping type is at least one of P-1, P-2, P-3, U-1, U-2, and U-3.

Optionally, the beam sweeping type is used to indicate a sweeping manner of the network device and a sweeping manner of the terminal device. According to a requirement in a current standard, the standard stipulates three downlink beam sweeping types and three uplink beam sweeping types, which are P-1, P-2, P-3, U-1, U-2, and U-3.

According to a second aspect, a wireless communication method is provided, including: generating, by a network device, configuration information, where the configuration information is used to indicate a beam sweeping type; and sending, by the network device, the configuration information to the terminal device.

Therefore, the network device sends, to the terminal device, the configuration information used to indicate the beam sweeping type, to resolve an issue of how to perform beam sweeping in a plurality of beam pairs to increase a beamforming gain and improve communication quality, and to reduce signaling overheads by determining a beam sweeping type by using configuration information.

Optionally, in an implementation of the second aspect, the network device sends information about a correspondence between the configuration information and the beam sweeping type to the terminal device, or the network device predefines information about a correspondence between the configuration information and the beam sweeping type.

Optionally, in an implementation of the second aspect, the configuration information is at least one type of the following information: resource set index information, resource setting index information, report content, quasi co-location QCL information, measurement setting index information, resource configuration index information, an interleaved frequency division multiple access IFDMA repetition factor (RPF) parameter, and a subcarrier spacing parameter.

In this case, based on the correspondence between the configuration information and the beam sweeping type, an instruction used to indicate the beam sweeping type does not need to be added into the configuration information that is used to indicate the beam sweeping type and that is sent by the network device to the terminal device. This can reduce signaling overheads.

Optionally, in an implementation of the second aspect, the beam sweeping type is at least one of P-1, P-2, P-3, U-1, U-2, and U-3.

Optionally, the beam sweeping type is used to indicate a sweeping manner of the network device and a sweeping manner of the terminal device. According to a requirement in a current standard, the standard stipulates three downlink beam sweeping types and three uplink beam sweeping types, which are P-1, P-2, P-3, U-1, U-2, and U-3.

According to a third aspect, a wireless communication method is provided, including: when a terminal device receives information that is sent by a network device and that is used to indicate that an uplink beam and a downlink beam have beam correspondence, determining beam indication information configured by the network device as downlink beam indication information; otherwise, determining beam indication information configured by the network device as sounding reference signal resource indication (SRI) information or uplink beam indication information.

Therefore, when the terminal device learns that the uplink beam and the downlink beam have the beam correspondence, the terminal device determines the beam indication information configured by the network device as downlink beam indication information. This can implement consistency between beam indication information corresponding to a case in which there is beam correspondence and beam indication information corresponding to a case in which there is no beam correspondence.

Optionally, in an implementation of the third aspect, the information includes 1-bit indicator Optionally, in an implementation of the third aspect, that the terminal device receives configuration information sent by a network device includes: the information used to indicate that the uplink beam and the downlink beam have the beam correspondence is received by using media access control-control element (MAC-CE) signaling or downlink control information (DCI) signaling.

Optionally, in an implementation of the third aspect, the information may be an N-bit indicator, or may be a QCL indicator or other indication information for implicit indication.

According to a fourth aspect, a wireless communication method is provided, including: when an uplink beam and a downlink beam have beam correspondence, generating, by a network device, information used to indicate that the uplink beam and the downlink beam have the beam correspondence; and sending, by the network device to the terminal device, the information used to indicate that the uplink beam and the downlink beam have the beam correspondence.

Therefore, the network device sends, to the terminal device, the information used to indicate that the uplink beam and the downlink beam have the beam correspondence, so that the terminal device uses beam indication information configured by the network device as downlink beam indication information. This can implement consistency between beam indication information corresponding to a case in which there is beam correspondence and beam indication information corresponding to a case in which there is no beam correspondence.

Optionally, in an implementation of the fourth aspect, the information includes 1-bit indicator.

Optionally, in an implementation of the fourth aspect, that the network device sends, to the terminal device, the information used to indicate that the uplink beam and the downlink beam have the beam correspondence includes: the information used to indicate that the uplink beam and the downlink beam have the beam correspondence is sent by using MAC-CE signaling or DCI signaling.

According to a fifth aspect, a terminal device is provided. The terminal device includes a receiving module and a determining module, to perform the method in any one of the first aspect or the optional implementations of the first aspect.

According to a sixth aspect, a network device is provided. The network device includes a generation module and a sending module, to perform the method in any one of the second aspect or the optional implementations of the second aspect.

According to a seventh aspect, a terminal device is provided. The terminal device includes a receiving module and a determining module, to perform the method in any one of the third aspect or the optional implementations of the third aspect.

According to an eighth aspect, a network device is provided. The network device includes a generation module and a sending module, to perform the method in any one of the fourth aspect or the optional implementations of the fourth aspect.

According to a ninth aspect, a terminal device is provided. The terminal device includes a memory, a transceiver, and a processor. The memory stores program code that may be used to execute any one of the first aspect or the optional implementations of the first aspect, or program code that may be used to execute any one of the third aspect or the optional implementations of the third aspect. The transceiver is configured to be driven by the processor to send/receive a specific signal. When the code is executed, the processor may implement various operations performed by the terminal device in the method.

According to a tenth aspect, a network device is provided, including a memory, a transceiver, and a processor. The memory stores program code that may be used to execute any one of the second aspect or the optional implementations of the second aspect or program code that may be used to execute any one of the fourth aspect, or the optional implementations of the fourth aspect. The transceiver is configured to be driven by the processor to send/receive a specific signal. When the code is executed, the processor may implement various operations performed by the terminal device in the method.

According to an eleventh aspect, a computer storage medium is provided. The computer storage medium stores program code. The program code may be used to instruct to perform the method in any one of the first aspect or the optional implementations of the first aspect, or the method in any one of the second aspect or the optional implementations of the second aspect, or the method in any one of the third aspect or the optional implementations of the third aspect, or the method in any one of the fourth aspect or the optional implementations of the fourth aspect.

DESCRIPTION OF EMBODIMENTS

Figure 1:
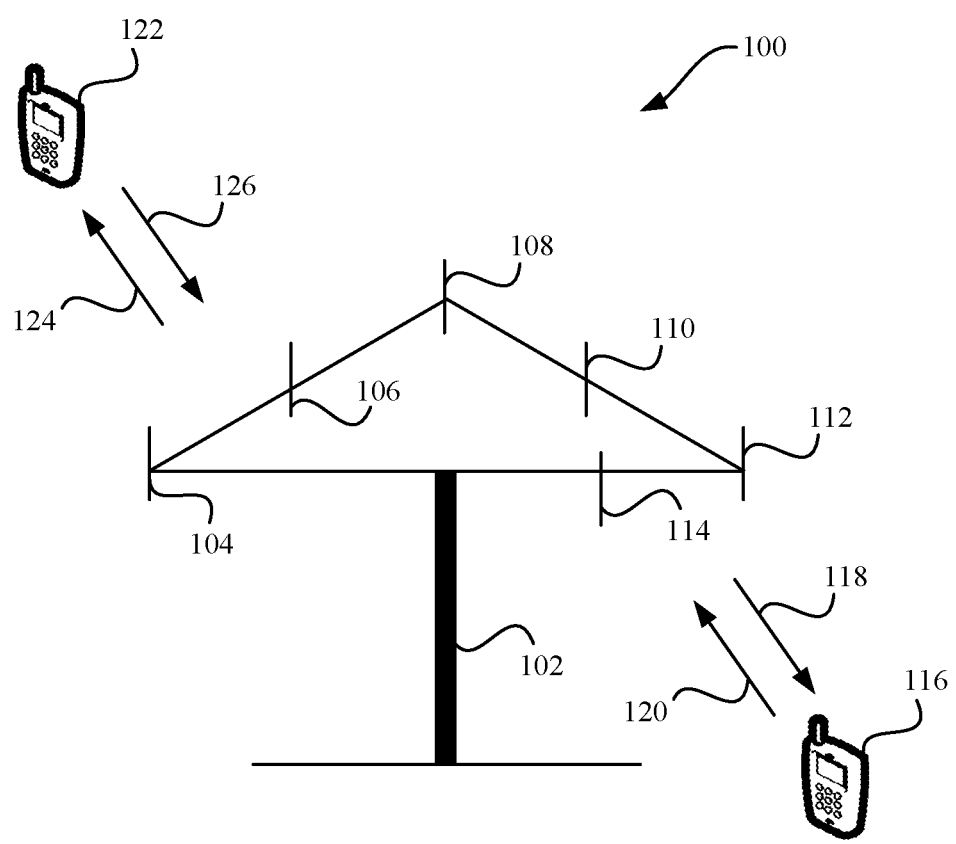
FIG. 1 is a schematic diagram of a communications system using a wireless communication method, a network device, and a terminal device according to this application.

The following describes technical solutions of this application with reference to accompanying drawings.

The following describes some terms in this application.

In this application, a signal is a representation form of information. The signal sometimes may be referred to as a wireless signal or a communication signal. In wireless communication, the signal may be sent from a communication node to another communication node by using an electromagnetic wave. According to different information content, there may be a plurality of types of signals. For example, a channel state information reference signal (CSI-RS) and a sounding reference signal (SRS) may be grouped into a reference signal. The reference signal may also be referred to as a pilot.

In this application, a beam is a communication resource. The beam may be a wide beam, a narrow beam, or a beam in another type. A technology for forming the beam may be a beamforming technology or another technical means. The beamforming technology may be specifically a digital beamforming technology, an analog beamforming technology, or a digital/analog mixed beamforming technology. The beamforming may also be referred to as beamforming. Different beams may be considered as different resources. Same information or different information may be sent by using different beams. Beams may be classified into a receive beam and a transmit beam. As optional understanding, the transmit beam may refer to signal strength distribution, in different spatial directions, of a signal transmitted by using an antenna. The receive beam may refer to signal strength distribution, in different spatial directions, of a wireless signal received from an antenna. The beam may have a plurality of names. For example, the beam may be referred to as a spatial resource, a spatial weight, a spatial direction, a spatial azimuth, or spatial quasi co-location (spatial QCL). With the development of technologies, the beam may have different names in different periods and different scenarios. This is not limited in this application.

In this application, a spatial parameter may be a receive-end spatial parameter or may be a transmit-end spatial parameter.

In this application, report may also be referred to as a feedback.

In this application, a measurement/report parameter may also be referred to as, for example, a report parameter, a pilot report parameter, a measurement amount, a reporting amount, or a measurement/report amount.

In this application, a measurement/report type may also be referred to as, for example, a report format or a measurement/report format.

In this application, a quasi-co-location (QCL) relationship is used to indicate that a plurality of resources have one or more identical or similar communication characteristics. For the plurality of resources having the quasi co-location relationship, identical or similar communication configurations may be used. For example, it may be considered that beam pair links for two beams having the QCL relationship are identical or similar, and identical or similar beam information may be used. For related content of the QCL, refer to related content in proposals R1-167970, R1-168436, R1-1610825, R1-1610520, R1-1613719, and R1-1613108 of 3GPP, and content in chapter 6.2.1 in a standard 3GPP TS 36.211 v13.0.0 and content in chapters 7.1.9 and 7.1.10 in a standard 3GPP TS 36.213 v14.1.0. In this application, activation may be understood as a form in which the network device configures the terminal device. An activation operation is performed to make system resources take effect. The resources include a beam resource, a pilot resource, a report resource, and any parameter that can be considered as a type of resource. For example, when a system configures a plurality of resource settings by using RRC layer signaling, one of the resource settings is activated by using MAC-CE signaling or DCI signaling; information or a resource corresponding to the resource setting takes effect based on information carried in activated signaling. For related content of the activation, refer to content in chapter 7.2.8 in a standard 3GPP TS 36.213 v14.1.0.

FIG. 1 is a schematic diagram of a communications system using a wireless communication method and devices according to this application. As shown in FIG. 1, the communications system 100 includes a network device 102, and the network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain may include a plurality of components (for example, a processor, a modulator, a multiplexer, a demodulator, a demultiplexer, and an antenna) related to signal sending and receiving. The network device has six different transmit beams B1 to B6 on a radio frequency channel, and performs different analog weighted processing on the six identical or different beams. The network device 102 may communicate with a plurality of terminal devices (such as a terminal device 116 and a terminal device 122). However, it can be understood that the network device 102 may communicate with any quantity of terminal devices similar to the terminal device 116 or 122.

As shown in the FIG. 1, the terminal device 116 communicates with the antennas 112 and 114, where the antennas 112 and 114 send information to the terminal device 116 by using a forward link 118, and receive information from the terminal device 116 by using a reverse link 120. In addition, the terminal device 122 communicates with the antennas 104 and 106, where the antennas 104 and 106 send information to the terminal device 122 by using a forward link 124, and receive information from the terminal device 122 by using a reverse link 126.

For example, in a frequency division duplex (FDD) system, the forward link 118 and the reserve link 120 may use different frequency bands, and the forward link 124 and the reverse link 126 may use different frequency bands.

For another example, in a time division duplex (TDD) system and a full duplex system, the forward link 118 and the reverse link 120 may use a common frequency band, and the forward link 124 and the reverse link 126 may use a common frequency band.

Each antenna (or an antenna group including a plurality of antennas) and/or each area that are/is designed for communication may be referred to as a sector of the network device 102. For example, the antenna group may be designed for communicating with a terminal device in the sector of a coverage area of the network device 102. In a process in which the network device 102 communicates with the terminal devices 116 and 122 respectively by using the forward links 118 and 124, a transmit antenna of the network device 102 may improve, through the beamforming, signal-to-noise ratios of the forward links 118 and 124. In addition, compared with a manner in which the network device sends signals to all terminal devices by using a single antenna, in this embodiment, when the network device 102 sends, through beamforming, the signals to the terminal devices 116 and 122 dispersed randomly in a related coverage area, less interference is caused onto a mobile device in a neighboring cell.

In a given time, the network device 102, the terminal device 116, or the terminal device 122 may be a wireless communication sending apparatus and/or a wireless communication receiving apparatus. During data sending, the wireless communication sending apparatus may encode the data for transmission. Specifically, the wireless communication sending apparatus may obtain (for example, generate, receive from another communications apparatus, or store in a memory) a particular quantity of data bits to be sent to the wireless communication receiving apparatus through a channel. The data bits may be included in a transport block (or a plurality of transport blocks) of data, and the transport block may be segmented to generate a plurality of code blocks.

In addition, the communications system 100 may be a public land mobile network (PLMN), a D2D (Device to Device) network, an M2M (Machine to Machine) network, or another network. FIG. 1 is only an example of a simplified schematic diagram. The network may further include another network device that is not shown in FIG. 1.

Optionally, in this application, the network device may be a device that communicates with a terminal device, for example, a network device or a network device controller. Each network device may provide communication coverage for a specific geographical area, and may communicate with a terminal device that is located in a coverage area (cell). The network device may support communication protocols in different standards, or may support different communication modes. For example, the network device may be a network device (Base Transceiver Station, BTS) in a GSM system or a CDMA system, may be a network device (NodeB, NB) in a WCDMA system, may be an evolved network device (Evolutional Node B, eNB or eNodeB) in an LTE system, or may be a wireless controller in a cloud radio access network (CRAN). Alternatively, the network device may be a network device in a future 5G network such as a gNB or a small cell, a pico cell, or a transmission reception point (TRP), may be a network device in a relay node, an access point, or a future evolved public land mobile network (PLMN), or the like.

Optionally, in this application, the terminal device may be an access terminal, user equipment (UE), a subscriber unit, a subscriber station, a mobile station, a mobile station, a remote station, a remote terminal, a mobile terminal, a user terminal, a terminal, a wireless communications device, a user agent, or a user apparatus. The access terminal may be, for example, a cellular phone, a cordless phone, a session initiation protocol (SIP) phone, a wireless local loop (WLL) station, a personal digital processing (Personal Digital Assistant, PDA), a handheld device having a wireless communication function, a computing device or another processing device connected to a wireless modem, a vehicle-mounted device, a wearable device, a terminal device in the Internet of Things, a virtual reality device, a terminal device in a future 5G network, or a terminal device in a future evolved public land mobile network (PLMN).

The wireless communication method and device provided in this application may be applied to a terminal device. The terminal device includes a hardware layer, an operating system layer that is run above the hardware layer, and an application layer that is run above the operating system layer. The hardware layer includes hardware such as a central processing unit (CPU), a memory management unit (MMU), and a memory (also referred to as a main memory). The operating system may be any one or more of computer operating systems that process a service by using a process, for example, a Linux operating system, a Unix operating system, an Android operating system, an iOS operating system, or a Windows operating system. The application layer includes applications such as a browser, a contact list, word processing software, and instant messaging software.

In addition, aspects or features of this application may be implemented as a method, an apparatus, or a product that uses standard programming and/or engineering technologies. The term "product" used in this application covers a computer program that can be accessed from any computer readable component, carrier, or medium. For example, the computer readable medium may include but is not limited to: a magnetic storage component (for example, a hard disk, a floppy disk or a magnetic tape), an optical disc (for example, a compact disc (CD), a digital versatile disc (DVD), a smart card, and a flash memory device (for example, an erasable programmable read-only memory (EPROM), a card, a stick, or a key drive). In addition, various storage media described in this specification may represent one or more devices and/or other machine readable media that are configured to store information. The term "machine readable media" may include but is not limited to various media that can store, contain, and/or carry an instruction and/or data.

For better understanding of this application, with reference to FIG. 2 to FIG. 6, the following describes this application by using an example of a system same as or similar to the system shown in FIG. 1.

Figure 2:
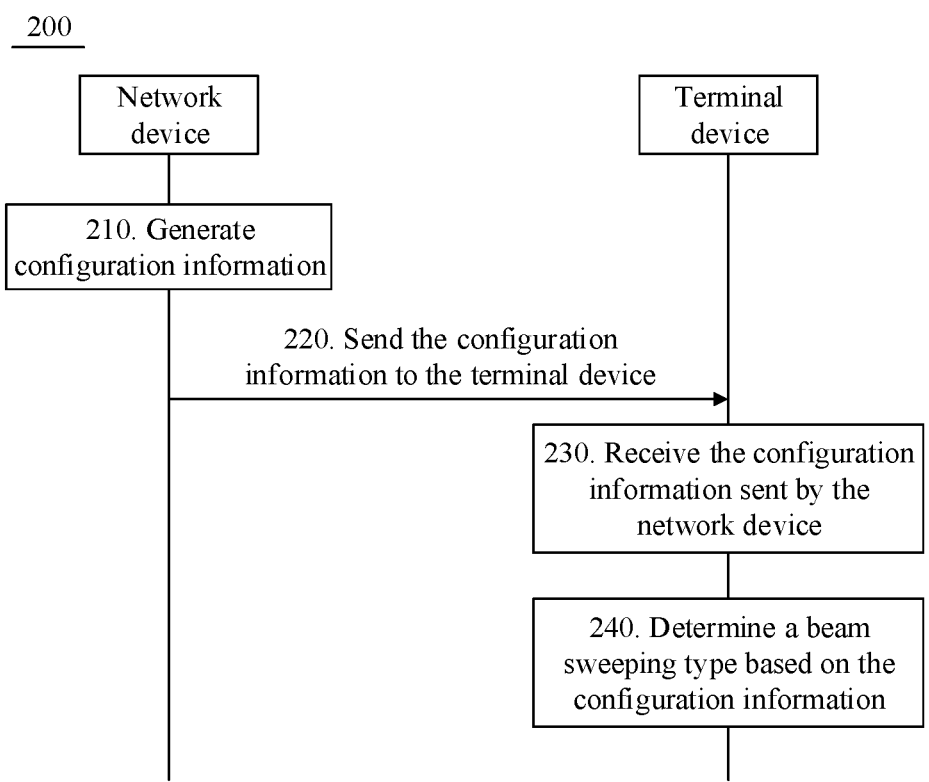
FIG. 2 is a schematic flowchart of a wireless communication method according to this application.

FIG. 2 is a schematic flowchart of a wireless communication method 200 according to this application. As shown in FIG. 2, the method 200 includes the following content.

In step 210, a network device generates configuration information, where the configuration information is used to indicate a beam sweeping type.

Optionally, the configuration information is at least one type of the following: resource set index information, resource setting index information, report content, quasi co-location QCL information, measurement setting index or indication information, resource configuration index or indication information, an interleaved frequency division multiple access IFDMA repetition factor (RPF) parameter, and a subcarrier spacing parameter.

Optionally, the beam sweeping type is at least one of P-1, P-2, P-3, U-1, U-2, and U-3.

The beam sweeping type is used to indicate a beam sweeping manner of the network device and a beam sweeping manner of a terminal device. According to a requirement in a current standard, the standard stipulates three downlink beam sweeping types and three uplink beam sweeping types, which are P-1, P-2, P-3, U-1, U-2, and U-3.

P-1 indicates that when downlink beam sweeping is performed, the terminal device and the network device simultaneously perform beam sweeping. P-2 indicates that when downlink beam sweeping is performed, the network device performs beam sweeping, and the terminal device does not perform beam sweeping; or the network device performs the beam sweeping; or the terminal device does not perform beam sweeping. P-3 indicates that when downlink beam sweeping is performed, the network device does not perform beam sweeping, and the terminal device performs beam sweeping; or the network device does not perform beam sweeping; or the terminal device performs beam sweeping. U-1 indicates that when uplink beam sweeping is performed, the terminal device and the network device simultaneously perform beam sweeping. U-2 indicates that when uplink beam sweeping is performed, the terminal device does not perform beam sweeping, and the network device performs beam sweeping; or the terminal device does not perform beam sweeping; or the network device performs beam sweeping. U-3 indicates that when uplink beam sweeping is performed, the terminal device performs beam sweeping, and the network device does not perform beam sweeping; or the terminal device performs beam sweeping; or the network device does not perform beam sweeping.

Optionally, the beam sweeping type is P-2 or U-3. Correspondingly, transmit-end spatial parameters (such as one or more of ZoD, ZsD, AoD, AsD, and Tx beamforming) of all ports for sent pilots are non-QCL, or all parameters are non-QCL; or transmit-end spatial parameters (such as one or more of ZoD, ZsD, AoD, AsD, and Tx beamforming) of all sent resources are non-QCL, or all parameters are non-QCL; or transmit-end spatial parameters (such as one or more of ZoD, ZsD, AoD, AsD, and Tx beamforming) of all sent resource sets are non-QCL, or all parameters are non-QCL; or transmit-end spatial parameters (such as one or more of ZoD, ZsD, AoD, AsD, and Tx beamforming) of all sent resource settings are non-QCL, or all parameters are non-QCL; or receive-end spatial parameters (such as one or more of ZoA, ZsA, AoA, AsA, and Rx beamforming) of all pilot ports are QCL, or all parameters are QCL; or receive-end spatial parameters (such as one or more of ZoA, ZsA, AoA, AsA, and Rx beamforming) of all resources are QCL, or all parameters are QCL; or receive-end spatial parameters (such as one or more of ZoA, ZsA, AoA, AsA, and Rx beamforming) of all resource sets are QCL, or all parameters are QCL; or receive-end spatial parameters (such as one or more of ZoA, ZsA, AoA, AsA, and Rx beamforming) of all resource settings are QCL, or all parameters are QCL.

The sweeping method is P-3 or U-2. Correspondingly, transmit-end spatial parameters (such as one or more of ZoD, ZsD, AoD, AsD, and Tx beamforming) of all ports for sent pilots are QCL, or all parameters are QCL; or transmit-end spatial parameters (such as one or more of ZoD, ZsD, AoD, AsD, and Tx beamforming) of all sent resources are QCL, or all parameters are QCL; or transmit-end spatial parameters (such as one or more of ZoD, ZsD, AoD, AsD, and Tx beamforming) of all sent resource sets are QCL, or all parameters are QCL; or transmit-end spatial parameters (such as one or more of ZoD, ZsD, AoD, AsD, and Tx beamforming) of all sent resource settings are QCL, or all parameters are QCL; or receive-end spatial parameters (such as one or more of ZoA, ZsA, AoA, AsA, and Rx beamforming) of all pilot ports are non-QCL, or all parameters are non-QCL; or receive-end spatial parameters (such as one or more of ZoA, ZsA, AoA, AsA, and Rx beamforming) of all resources are non-QCL, or all parameters are non-QCL; or receive-end spatial parameters (such as one or more of ZoA, ZsA, AoA, AsA, and Rx beamforming) of all resource sets are non-QCL, or all parameters are non-QCL; or receive-end spatial parameters (such as one or more of ZoA, ZsA, AoA, AsA, and Rx beamforming) of all resource settings are non-QCL, or all parameters are non-QCL.

In step 220, the network device sends the configuration information to the terminal device.

In step 230, the terminal device receives the configuration information sent by the network device, where the configuration information is used to indicate a beam sweeping type.

In step 240, the terminal device determines the beam sweeping type based on the configuration information.

Optionally, that the determining the beam sweeping type based on the configuration information includes:

determining the beam sweeping type based on the configuration information and information about a correspondence between the configuration information and the beam sweeping type.

Optionally, when the configuration information is a resource set index, the beam sweeping type is determined based on the resource set index and a correspondence between the resource set index and the beam sweeping type.

Specifically, the resource setting includes resource sets for a plurality of beam sweeping types. Index IDs of the resource sets are in a one-to-one correspondence with beam sweeping types, as shown in Table 1.

TABLE 1

Correspondence between a resource set index and a beam sweeping type

| Beam sweeping type | Resource set index |
|---|---|
| P-1 | Resource set index 0 (Resource set #0) |
| P-2 | Resource set index 1 (Resource set #1) |
| P-3 | Resource set index 2 (Resource set #2) |

The correspondences between the resource set indexes and the beam sweeping types may be sent to the terminal device by using RRC signaling, MAC-CE signaling, or DCI signaling, or may be prestored or preconfigured in the network device and the terminal device. In a beam management process, corresponding resource set index information is configured or a corresponding resource set is activated, and a corresponding beam sweeping type can be obtained based on a correspondence between the corresponding resource set index information and the beam sweeping type.

Optionally, the resource set index information may include a plurality of resource set indexes, to implement beam management combining different beam sweeping processes. A time relationship corresponding to different beam sweeping types is determined by a location relationship in the index information. For example, configuration information is {resource set #2, resource set #1}, beam sweeping is performed based on P-3, and then beam sweeping is performed based on P-2. A time difference between the two beam sweeping processes may be configured by a base station for the terminal device, or may be a default value defined by a standard.

Optionally, a corresponding beam sweeping type and pilot resource configuration information may be obtained by configuring corresponding beam sweeping type indication information (P-2, P-3, U-2, U-3, U-2+P-3, or P-3+P-2), and by using a correspondence between corresponding resource set index information and the beam sweeping type. The beam sweeping type indication information may include a plurality of beam sweeping types, to implement beam management combining different beam sweeping processes. A time relationship corresponding to different beam sweeping types is determined by a location relationship in the index information. For example, configuration information is {P-3, P-2}, beam sweeping is performed first based on P-3, and then beam sweeping is performed based on P-2. A time difference corresponding to the two processes may be configured by a system, or may be a system default value, and by analogy to another process with joint beam management.

Optionally, the resource set index may be an index number ID, a bit indication BITMAP, or other indication information having an equivalent function.

It should be understood that uplink beam sweeping may be implemented by changing the beam sweeping type P-1, P-2, or P-3 to U-1, U-2, or U-3.

Optionally, each RS resource set is corresponding to one resource set index used to uniquely identify the resource set.

Optionally, each RS resource set includes one or more RS resources, and each RS resource is corresponding to one resource index used to uniquely identify the resource.

It should be understood that each RS resource includes one or more types of the following information:

time-domain resource information of each RS, a time-domain behavior sent by the RS, function indication information of the RS, where the function indication information is used to indicate a function of the RS. For example, when the indication information is a first value, the indication information is used to indicate that the RS is used for interference measurement (IM); when the indication information is a second value, the indication information is used to indicate that the RS is used for channel state measurement; or when the indication information is a third value, the indication information indicates that the RS is used for beam management (BM)

Optionally, the information used to indicate the function of the RS may be power information. For example, a new field or a new row is added to power information provided in existing LTE, to identify a function of an RS. When a value is zero or null, it indicates that the RS is used for interference measurement. When a value is another value, it indicates that the RS is non-zero power used for channel estimation.

Optionally, time-domain resource information of each RS includes one or more types of the following information: a quantity of OFDM symbols occupied by the RS, information about a location at which each OFDM symbol is located in a subframe, a quantity of ports of the RS on one OFDM symbol, mapping information of a resource element (RE) (mapping to REs). The information is mainly used to notify a receiver of a specific time-frequency location of the RS. A receive side can measure the RS based only on the information.

Specifically, the time-domain behavior may be periodic, aperiodic, and semi-persistent. The periodic time-domain behavior indicates that a measurement resource of a reference signal configured by the network device appears at regular intervals. The semi-persistent time-domain behavior indicates that a measurement resource of a reference signal configured by the network device appears periodically within specified duration, and no limitation is imposed beyond the specified duration. The aperiodic time-domain behavior indicates that a measurement resource of a temporary reference signal is configured by the network device for user equipment. When the time-domain behavior indicated by the network device is periodic, specific duration usually needs to be indicated as a period. For example, 50 ms is a period, or 100 ms is a period. The time-domain behavior is mainly used to notify a receiver of a period, a frequency, and a time for a transmitter to transmit a reference signal, so that the receiver can receive the reference signal.

Optionally, when the configuration information is a resource setting index, the beam sweeping type is determined based on the resource setting index and a correspondence between the resource setting index and the beam sweeping type.

Specifically, in a pilot configuration process, resource settings for a plurality of beam sweeping types are included. Indexes (IDs) of the resource settings are in one-to-one correspondence to beam sweeping types, as shown in the following table.

TABLE 2

Correspondence between a resource setting and beam sweeping type

| Beam sweeping type | Resource setting index |
| --- | --- |
| P-1 | Resource setting index 0 (Resource set #0) |
| P-2 | Resource setting index 1 (Resource set #1) |
| P-3 | Resource setting index 1 (Resource set #1) |

The correspondences between the resource setting indexes and the beam sweeping types may be sent to the terminal device by using RRC signaling, MAC-CE signaling, or DCI signaling, or may be prestored or preconfigured in the network device and the terminal device. In a beam management process, corresponding resource setting index information is configured or a corresponding resource setting is activated, and a corresponding beam sweeping type and corresponding resource setting index information may be obtained by using a correspondence between the corresponding resource setting index information and the beam sweeping type. The resource setting index information may include a plurality of resource setting indexes, to implement beam management combining different beam sweeping processes. A time relationship corresponding to different beam sweeping types is determined by a location relationship in the index information. For example, configuration information is {resource setting #1, resource setting #0}, beam sweeping is performed first based on P-3, and then beam sweeping is performed based on P-2. A time difference corresponding to the two processes may be configured by a system, or may be a system default value, and by analogy to another process with joint beam management.

Optionally, a corresponding beam sweeping type and pilot resource configuration information may be obtained by configuring corresponding beam sweeping type indication information (P-2, P-3, U-2, U-3, U-2+P-3, or P-3+P-2), and by using a correspondence between corresponding resource setting index information and the beam sweeping type. The beam sweeping type indication information may include a plurality of beam sweeping types, to implement beam management combining different beam sweeping processes. A time relationship corresponding to different beam sweeping types is determined by a location relationship in the index information. For example, configuration information is {P-3, P-2}, beam sweeping is performed first based on P-3, and then beam sweeping is performed based on P-2. A time difference between the two processes may be configured by a base station for the terminal device, or may be a default value defined by a standard.

Optionally, the resource setting index information may be an index number (ID), an indication bitmap, or other indication information having an equivalent function.

It should be understood that uplink beam sweeping may be implemented by changing the beam sweeping type P-1, P-2, or P-3 to U-1, U-2, or U-3.

It should be understood that each resource setting includes one or more RS resource sets and a resource type. The resource type is used to identify a function or use of a reference signal resource. For example, when the resource type is a first value, the resource type is used to identify that the reference signal is used for beam management. When the resource type is a second value, the resource type is used to indicate that the reference signal is used for channel state information acquisition (CSI acquisition).

Optionally, when the configuration information is report content. The beam sweeping type is determined based on the report content and a correspondence between the report content and the beam sweeping type.

Specifically, in beam sweeping processes, content that should be reported by the terminal device to the network device is different. For example, in a sweeping process of P-2, the terminal device needs to report transmit beam information, of the network device, selected by the terminal device and related RSRP or CSI information. However, in a sweeping process of P-3, the terminal device only needs to feed back RSRP or CSI information, with no need to report transmit beam information of the network device. Therefore, a type in content that should be reported by the terminal device to the network device may be used to indicate a beam sweeping method, as shown in Table 3.

TABLE 3

Correspondence between report content and a beam sweeping type

| Index information | Report content | Beam sweeping type |
|---|---|---|
| 0 | Type 1 (transmit beam information, RSRP, CSI) | P-2 |
| 1 | Type 2 (RSRP, CSI) | P-3 |

Each report setting includes at least one type of the following content:

a report beam management (BM) parameter, a CSI type, codebook configuration information such as codebook subset restriction, a time-domain behavior, a frequency-domain granularity, and a measurement restriction configuration.

The report setting is used to indicate specific information fed back by the terminal device to the network device, and a way how to feed back the information, or a feedback frequency or period.

The report beam management parameter may include one or more of a resource setting index, a resource set index, a resource index, a pilot port index, and an SS block index.

The frequency-domain granularity refers to information about a subcarrier corresponding to one or more RS measurement resources in frequency domain, and may be information, such as a subcarrier number, a subcarrier width, and a subcarrier spacing, corresponding to a subcarrier in one or more resource blocks (RB).

It should be understood that the correspondences between the different report content types and the different beam sweeping types may be predefined, or configured on a network device side. Signaling configured by the network device may be, for example, RRC/MAC-CE/DCI.

The terminal device obtains, based on the report content configured or activated by the network device, the beam sweeping type by using the correspondence between the report content and the beam sweeping type; and instructs, based on the beam sweeping type, the terminal device to receive a beam; or obtains corresponding report content and a corresponding beam sweeping type based on the index number information configured by the network device.

Optionally, a report type may be indicated by using the correspondence between report content and a sweeping method and by configuring the beam sweeping type.

Optionally, when the configuration information is quasi co-location (QCL) information, the beam sweeping type is determined based on the quasi co-location information.

For example, for downlink beam sweeping, if the beam sweeping type is P-2 or U-3, correspondingly, transmit-end spatial parameters (such as one or more of ZoD, ZsD, AoD, AsD, and Tx beamforming) of all ports for sent pilots are non-QCL, or all parameters are non-QCL; or transmit-end spatial parameters (such as one or more of ZoD, ZsD, AoD, AsD, and Tx beamforming) of all sent resources are non-QCL, or all parameters are non-QCL; or transmit-end spatial parameters (such as one or more of ZoD, ZsD, AoD, AsD, and Tx beamforming) of all sent resource sets are non-QCL, or all parameters are non-QCL; or transmit-end spatial parameters (such as one or more of ZoD, ZsD, AoD, AsD, and Tx beamforming) of all sent resource settings are non-QCL, or all parameters are non-QCL; or receive-end spatial parameters (such as one or more of ZoA, ZsA, AoA, AsA, and Rx beamforming) of all pilot ports are QCL, or all parameters are QCL; or receive-end spatial parameters (such as one or more of ZoA, ZsA, AoA, AsA, and Rx beamforming) of all resources are QCL, or all parameters are QCL; or receive-end spatial parameters (such as one or more of ZoA, ZsA, AoA, AsA, and Rx beamforming) of all resource sets are QCL, or all parameters are QCL; or receive-end spatial parameters (such as one or more of ZoA, ZsA, AoA, AsA, and Rx beamforming) of all resource settings are QCL, or all parameters are QCL.

If the beam sweeping type is P-3 or U-2, correspondingly, transmit-end spatial parameters (such as one or more of ZoD, ZsD, AoD, AsD, and Tx beamforming) of all ports for sent pilots are QCL, or all parameters are QCL; or transmit-end spatial parameters (such as one or more of ZoD, ZsD, AoD, AsD, and Tx beamforming) of all sent resources are QCL, or all parameters are QCL; or transmit-end spatial parameters (such as one or more of ZoD, ZsD, AoD, AsD, and Tx beamforming) of all sent resource sets are QCL, or all parameters are QCL; or transmit-end spatial parameters (such as one or more of ZoD, ZsD, AoD, AsD, and Tx beamforming) of all sent resource settings are QCL, or all parameters are QCL; or receive-end spatial parameters (such as one or more of ZoA, ZsA, AoA, AsA, and Rx beamforming) of all pilot ports are non-QCL, or all parameters are non-QCL; or receive-end spatial parameters (such as one or more of ZoA, ZsA, AoA, AsA, and Rx beamforming) of all resources are non-QCL, or all parameters are non-QCL; or receive-end spatial parameters (such as one or more of ZoA, ZsA, AoA, AsA, and Rx beamforming) of all resource sets are non-QCL, or all parameters are non-QCL; or receive-end spatial parameters (such as one or more of ZoA, ZsA, AoA, AsA, and Rx beamforming) of all resource settings are non-QCL, or all parameters are non-QCL.

Optionally, when the configuration information is a measurement setting index, the beam sweeping type is determined based on the measurement setting index and a correspondence between the measurement setting index and the beam sweeping type.

For measurement settings, a plurality of types of measurement settings may be predefined, and each type is corresponding to one beam sweeping type, as shown in Table 4.

TABLE 4

Correspondence between a measurement setting type and a beam sweeping type

| Index information | Resource setting type | Beam sweeping type |
| --- | --- | --- |
| 0 | Type 1 | P-2 |
| 1 | Type 2 | P-3 |

The measurement setting type may be an index of a different measurement setting or a link index corresponding to a measurement setting. The correspondences between the measurement setting type indexes and the beam sweeping types may be sent to the terminal device by using RRC signaling, MAC-CE signaling, or DCI signaling, or may be prestored or preconfigured in the network device and the terminal device.

The terminal device obtains, based on the measurement setting type configured by the network device or a corresponding measurement setting activated by the network device, the beam sweeping type by using the correspondences between the measurement setting type indexes and the beam sweeping types; and instructs, based on the beam sweeping type, a terminal device side to receive a beam; or obtains a corresponding measurement setting type and a corresponding beam sweeping type based on the index number information configured by the network device.

Optionally, when the configuration information is a pilot resource configuration index, the beam sweeping type is determined based on the resource configuration index and a correspondence between the resource configuration index and the beam sweeping type.

Specifically, when one resource is corresponding to only one beam, a beam sweeping type may be indicated by using configuration content of the resource. For example, in a beam sweeping process of P-3 or U-3, a quantity of symbols occupied by one resource is greater than 1, and in a beam sweeping process of P-2 or U-2, a quantity of symbols occupied by one resource is equal to 1.

Different quantities of symbols occupied in resource configurations implicitly indicate beam sweeping types. If a quantity of symbols occupied by a resource is greater than 1, a beam sweeping type is P-3 or U-3. If a quantity of occupied symbols is equal to 1, a beam sweeping type is P-2 or U-2. A correspondence between a resource configuration and a beam sweeping type is shown in Table 5.

TABLE 5

Correspondence between a resource configuration and a beam sweeping type

| Index information | Resource configuration | Beam sweeping type |
| --- | --- | --- |
| 0 | Quantity of occupied symbols is greater than 1 | P-3, U-2 |
| 1 | Quantity of occupied symbols is equal to 1 | P-2, U-3 |

The correspondences between the different resource configuration information and the different beam sweeping types may be sent to the terminal device by using RRC signaling, MAC-CE signaling, or DCI signaling, or may be prestored or preconfigured in the network device and the terminal device. In addition, the resource herein may come from a same resource setting or resource set, or the resource comes from different resource settings or resource sets.

The terminal device obtains, based on the resource configuration information configured or activated by the network device, the beam sweeping type by using the correspondence between the resource configuration and the beam sweeping type; and instructs, based on the beam sweeping type, a terminal device side to receive a beam; or obtains a corresponding pilot resource configuration and a corresponding beam sweeping type based on the index number information configured on a network device side.

Optionally, a used pilot resource may be implicitly indicated by using the correspondence between the resource configuration type and a sweeping method and by configuring the beam sweeping type.

Optionally, when the configuration information is an interleaved frequency division multiple access factor, the beam sweeping type is determined based on the interleaved frequency division multiple access factor and a correspondence between the interleaved frequency division multiple access factor and the beam sweeping type.

Specifically, to reduce overheads of beam sweeping, a pilot may be transmitted through IFDMA. Considering that a manner of dividing one symbol into a plurality of sub-symbols through IFDMA does not support beam sweeping on the network device side, a beam sweeping type may be indicated by using a correspondence between an IFDMA configuration parameter and the beam sweeping type. For example, as shown in Table 6, when the beam sweeping type is P-2 or U-3, an IFDMA repetition factor is 1; when the beam sweeping type is P-3 or U-2, an IFDMA repetition factor is 2.

TABLE 6

Correspondence between an IFDMA configuration parameter and a beam sweeping type

| Index information | Configuration of an IFDMA repetition factor | Beam sweeping type |
| --- | --- | --- |
| 0 | Repetition factor 1 | P-2, U-3 |
| 1 | Repetition factor 2 | P-3, U-2 |

The correspondences between the different IFDMA configuration parameters and the different beam sweeping types may be sent to the terminal device by using RRC signaling, MAC-CE signaling, or DCI signaling, or may be prestored or preconfigured in the network device and the terminal device.

The terminal device obtains, based on the IFDMA repetition factor information configured or activated by the network device, the beam sweeping type by using the correspondence between an IFDMA repetition factor and the beam sweeping type; and instructs, based on the beam sweeping type, a terminal device side to receive a beam; or obtains a corresponding IFDMA repetition factor and a corresponding beam sweeping type based on the index number information configured on a network device side.

Optionally, a used IFDMA repetition factor may be implicitly indicated by using a correspondence between an IFDMA configuration parameter and a sweeping method and by configuring the beam sweeping type.

Optionally, when the configuration information is a subcarrier spacing parameter index, the beam sweeping type is determined based on the subcarrier spacing parameter index and a correspondence between the subcarrier spacing parameter index and the beam sweeping type.

Specifically, to reduce overheads of beam sweeping, a pilot may be transmitted by using a larger subcarrier spacing. Considering a beam sweeping capability imbalance between a network device side and a terminal device side, in a process of performing beam sweeping on the network device side, a larger subcarrier spacing may be used to reduce sweeping overheads; and in a process of performing beam sweeping on the terminal device side, because of impact caused by a beam switching time, a smaller subcarrier spacing is used to ensure that the beam switching time is within a range of a cyclic prefix. In this case, a beam sweeping manner may be implicitly indicated by using a difference between subcarrier spacings for scanning on the network device side and the terminal device side. A correspondence between a subcarrier spacing configuration parameter and a beam sweeping type is shown in the following table.

TABLE 7

Correspondence between a subcarrier spacing configuration parameter and a beam sweeping type

| Index information | Subcarrier spacing configuration parameter | Beam sweeping type |
|---|---|---|
| 0 | Subcarrier spacing parameter #1 | P-2 |
| 1 | Subcarrier spacing parameter #2 | P-3 |

The subcarrier spacing parameter herein may be information such as a subcarrier spacing, a multiple of a reference subcarrier spacing, a quantity of sub-symbols into which one reference symbol is divided. The correspondences between the different subcarrier spacing configuration parameters and the different beam sweeping types may be sent to the terminal device by using RRC signaling, MAC-CE signaling, or DCI signaling, or may be prestored or preconfigured in the network device and the terminal device.

The terminal device obtains, based on the subcarrier spacing parameter configured or activated by the network device, the beam sweeping type by using the correspondence between the subcarrier spacing parameter and the beam sweeping type; and instructs, based on the beam sweeping type, the terminal device to receive a beam; or obtains a corresponding subcarrier spacing parameter and a corresponding beam sweeping type based on the index number information configured by the network device.

It should be understood that uplink beam sweeping may be implemented by changing the beam sweeping type P-2 or P-3 to U-2 or U-3.

Optionally, the terminal device receives the information about the correspondence between the configuration information and the beam sweeping type, sent by the network device, or predefines the information about the correspondence between the configuration information and the beam sweeping type.

Optionally, the configuration information received by the terminal device may be any combination of several types of configuration information: resource set index or indication information, resource setting index or indication information, report content, quasi co-location QCL information, measurement setting index or indication information, resource setting index or indication information, an interleaved frequency division multiple access IFDMA repetition factor (RPF) parameter, and a subcarrier spacing parameter.

It should be noted that the correspondence between the configuration information and the beam sweeping type in this application is only an example, which is not limited thereto. The correspondence between the configuration information and the beam sweeping type may be indicated in another manner.

Therefore, in this application, the beam sweeping type is determined based on the configuration information, to resolve an issue of how to perform beam sweeping in a plurality of beam pairs to increase a beamforming gain and improve communication quality, and to reduce signaling overheads by using configuration information.

Figure 3:
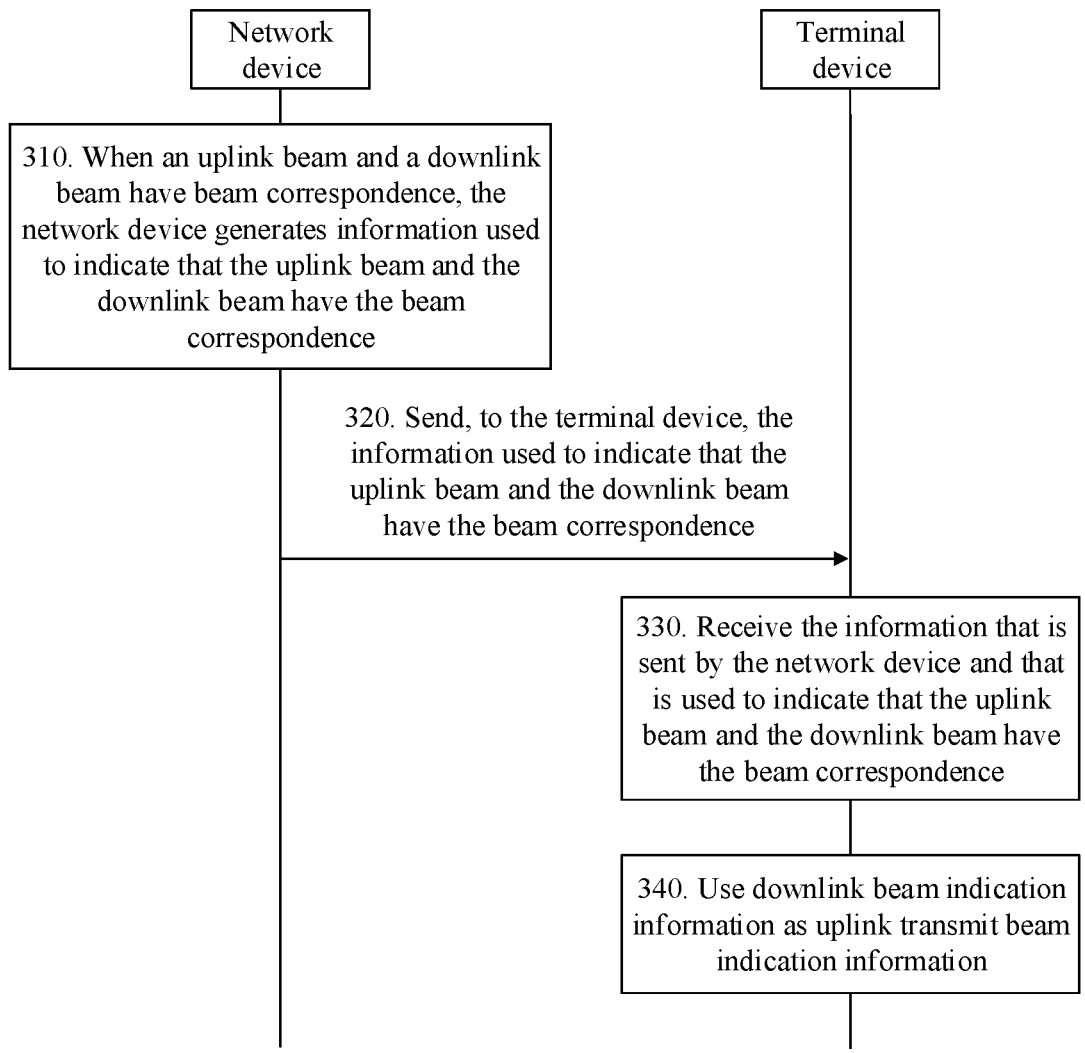
FIG. 3 is a schematic flowchart of a wireless communication method according to this application.

FIG. 3 is a schematic flowchart of a wireless communication method 300 according to this application. As shown in FIG. 3, the method 300 includes the following content.

In step 310, when an uplink beam and a downlink beam have beam correspondence, a network device generates information used to indicate that the uplink beam and the downlink beam have the beam correspondence.

Specifically, for information indicating uplink transmit beam of a terminal device, when the uplink beam and the downlink beam have the beam correspondence, the indication information is downlink receive beam indication information. When the uplink beam and the downlink beam have no beam correspondence, the indication information is sounding reference signal resource indicator (SRS-resource-indicator, SRI) information or uplink transmit beam indication information.

In step 320, the network device sends, to the terminal device, the information used to indicate that the uplink beam and the downlink beam have the beam correspondence.

In step 330, the terminal device receives the information that is sent by the network device and that is used to indicate that the uplink beam and the downlink beam have the beam correspondence.

In step 340, the uplink transmit beam information of the terminal device is the downlink receive beam indication information; otherwise, the uplink transmit beam information of the terminal device is the SRI or the uplink transmit beam indication information.

Specifically, because uplink transmit beam indication information corresponding to a case in which the uplink beam and the downlink beam have the beam correspondence is inconsistent with uplink transmit beam indication information corresponding to a case in which the uplink beam and the downlink beam have no beam correspondence, the terminal device needs to determine the uplink transmit beam information based on the information that is sent by the network device and that is used to indicate that the uplink beam and the downlink beam have the beam correspondence.

If the terminal device receives the information that is sent by the network device and that is used to indicate that the uplink beam and the downlink beam have the beam correspondence, the uplink transmit beam information of the terminal device is the downlink receive beam indication information.

If the terminal device has reported, to the network device, the information used to indicate that the uplink beam and the downlink beam have the beam correspondence, the uplink transmit beam information of the terminal device is the downlink receive beam indication information.

If the terminal device does not receive the information that is sent by the network device and that is used to indicate that the uplink beam and the downlink beam have the beam correspondence, the uplink transmit beam information of the terminal device is the SRI or the uplink transmit beam indication information.

If the terminal device has reported, to the network device, the information used to indicate that the uplink beam and the downlink beam have no beam correspondence, the uplink transmit beam information of the terminal device is the SRI or the uplink transmit beam indication information.

Optionally, the information includes 1-bit indicator.

It should be understood that the information that is sent by the network device to the terminal device and that is used to indicate that the uplink beam and the downlink beam have the beam correspondence may be an N-bit indicator, or may be a QCL indicator or other indication information that achieves a same objective.

Optionally, that the terminal device receives configuration information sent by the network device includes:

the information used to indicate that the uplink beam and the downlink beam have the beam correspondence is received by using MAC-CE signaling or DCI signaling.

Therefore, in this application, when the uplink beam and the downlink beam have the beam correspondence, the uplink transmit beam information of the terminal device is downlink receive beam indication information. This can reduce signaling overheads.

Figure 4:
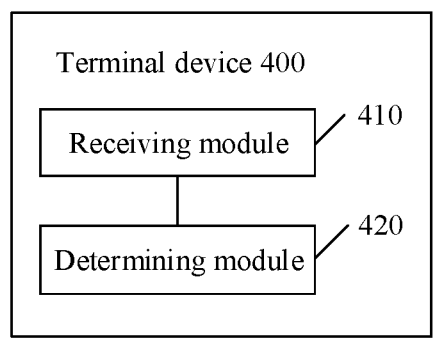
FIG. 4 is a schematic block diagram of a terminal device according to this application.

FIG. 4 is schematic block diagram of a terminal device 400 according to this application. As shown in FIG. 4, the terminal device 400 includes:

a receiving module 410, configured to receive configuration information sent by a network device, where the configuration information is used to indicate a beam sweeping type; and a determining module 420, configured to determine the beam sweeping type based on the configuration information.

Optionally, the receiving module 410 and the determining module 420 are configured to perform the operations in the wireless communication method 200 of this application. For brevity, details are not described again.

Optionally, the terminal device 400 may be further configured to perform the wireless communication method 300 of this application. When the terminal device 400 is configured to perform the method 300, the receiving module 410 is configured to receive information that is sent by the network device and that is used to indicate that an uplink beam and a downlink beam have beam correspondence; and the determining module 420 is configured to: use downlink beam indication information as uplink transmit beam information; otherwise, use SRI information or uplink beam indication information as uplink transmit beam information.

In this application, the downlink beam indication information is beam information obtained by measuring a downlink pilot signal. The uplink beam indication information is beam information obtained by measuring an uplink pilot signal. The beam information may be one or more types of the following information on a network side or a terminal side: analog beam information, precoding information, spatial quasi co-location index (spatial QCL indication or indicator) information, and quasi co-location (QCL) index information.

In this application, the uplink transmit beam information may be one or more types of the following information on a network device side or a terminal device side: precoding information, spatial QCL index (spatial QCL indication or indicator) information, and quasi co-location (QCL) information.

Optionally, the receiving module 410 and the determining module 420 are configured to perform the operations in the wireless communication method 300 of this application. For brevity, details are not described again.

Figure 5:
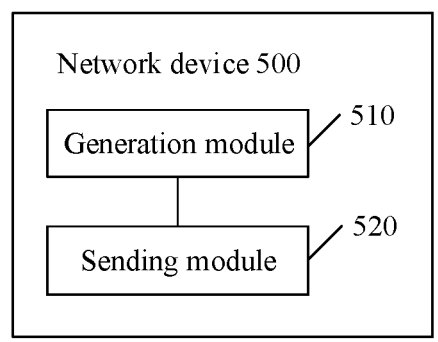
FIG. 5 is a schematic block diagram of a network device according to this application.

FIG. 5 is schematic block diagram of a network device 500 according to this application. As shown in FIG. 5, the network device 500 includes:

a generation module 510, configured to generate configuration information, where the configuration information is used to indicate a beam sweeping type; and a sending module 520, configured to send the configuration information to a terminal device.

Optionally, the generation module 510 and the sending module 520 are configured to perform the operations in the wireless communication method 200 of this application. For brevity, details are not described again.

Optionally, the network device 500 may be further configured to perform the wireless communication method 300 of this application. When the network device 500 is configured to perform the method 300, the generation module 510 is configured to: when an uplink beam and a downlink beam have beam correspondence, generate, by the network device, information used to indicate that the uplink beam and the downlink beam have the beam correspondence, and the sending module 520 is configured to send, to the terminal device, the information used to indicate that the uplink beam and the downlink beam have the beam correspondence.

Optionally, the generation module 510 and the sending module 520 are configured to perform the operations in the wireless communication method 300 of this application. For brevity, details are not described again.

The network device and the terminal device are completely corresponding to the network device and the terminal device in the method embodiment. Corresponding modules perform corresponding steps. For details, refer to corresponding method embodiments.

Figure 6:
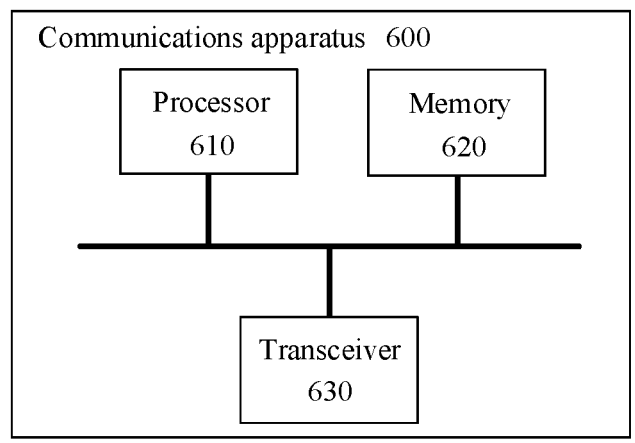
FIG. 6 is a schematic block diagram of a communications apparatus according to this application.

FIG. 6 is a schematic block diagram of a communications apparatus 600 according to this application. The communications apparatus 600 includes:

a memory 610, configured to store a program, where the program includes code;

a transceiver 620, configured to communicate with another device; and a processor 630, configured to execute the program code in the memory 610.

Optionally, when the code is executed, the processor 630 may perform the operations in the method 200 or the method 300. For brevity, details are not described again. In this case, the communications apparatus 600 may be a network device or a terminal device. The transceiver 620 is configured to be driven by the processor 630 to send/receive a specific signal.

The communications apparatus 600 may be the foregoing network device or terminal device, to perform corresponding operations of the determining module and the generation module. The transceiver may perform corresponding steps of the sending module and the receiving module.

In this application, the communications apparatus is an apparatus having a communication function. For example, the communications apparatus may be a base station, a terminal, a baseband chip, a communication chip, or a sensor chip. The technical solutions in this application may be applicable to different communications apparatuses. In this embodiment of this application, the network device and the terminal device are mainly used as an example for description.

In this application, the term "including" and a variant thereof may be "non-limitative including". The term "or" and a variant thereof may be "and/or". The terms "related", "related", "corresponding", and variants thereof may be, for example, "bound", "bound to . . . ", "having a mapping relationship", "configured", "allocated", "based on . . . ", or "obtained based on . . . ". The term "through" and a variant thereof may be, for example, "by utilizing", "by using", or "on . . . ". The term "obtain", "determine", and variants thereof may be, for example, "select", "query", and "calculate". The term "when . . . " may be, for example, "if" or "in a case . . . ".

In this application, use of ordinal numbers such as "first" and "second" are intended to distinguish between different objects, and not intended to limit a sequence.

In this application, use of numbers such as "1" and "2" are intended to distinguish between different objects, and not intended to limit a sequence.

A person of ordinary skill in the art may be aware that units and algorithm steps in the examples described with reference to the embodiments disclosed in this application can be implemented by electronic hardware or a combination of computer software and electronic hardware. Whether the functions are performed by hardware or in a software manner depends on particular applications and design constraints of the technical solutions. A person skilled in the art may use different methods to implement the described functions for all particular applications, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments, and details are not described again.

In the several embodiments provided in this application, it should be understood that the disclosed system, apparatus, and method may be implemented in other manners. For example, the described apparatus embodiment is merely an example. For example, the unit division is merely logical function division, or may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and components displayed as units may or may not be physical units. To be specific, the components may be located in one position, or may be distributed onto a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on this understanding, the technical solutions of this application essentially, or the part contributing to the prior art, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used, all or some of the embodiments may be implemented in a form of a computer program product. The computer program product includes one or more computer instructions. When the computer program instruction is loaded and executed on the computer, all or some of the procedures or functions described in this application are generated. The computer may be a general-purpose computer, a special-purpose computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be, for example, a magnetic medium (for example, a floppy disk, a hard disk, or a magnetic tape), an optical medium, or a semiconductor medium (for example, a solid-state drive (SSD).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   receiving, by a terminal device, configuration information from a network device, wherein the configuration information is used to indicate a plurality of beam sweeping types, wherein the configuration information includes resource set index information, wherein the resource set index information includes a plurality of resource set indexes, and wherein each resource set index of the plurality of resource set indexes corresponds to a beam sweeping type of the plurality of beam sweeping types; and determining, by the terminal device, the plurality of beam sweeping types based on the configuration information.

2. The method according to claim 1, wherein the determining, by the terminal device, the plurality of beam sweeping types based on the configuration information comprises:

determining, by the terminal device, the plurality of beam sweeping types based on the configuration information and information about correspondences between the plurality of resource set indexes and the plurality of beam sweeping types.

3. The method according to claim 2, wherein the information about the correspondences between the plurality of resource set indexes and the plurality of beam sweeping types is received by the terminal device from the network device, or the information about the correspondences between the plurality of resource set indexes and the plurality of beam sweeping types is predefined.

4. The method according to claim 1, wherein the configuration information includes at least one type of report content, quasi co-location information, an interleaved frequency division multiple access repetition factor parameter, or a subcarrier spacing parameter.

5. The method according to claim 1, wherein the resource set index information includes two resource set indexes corresponding to two beam sweeping types, and wherein the configuration information further includes a time difference between performing the two beam sweeping types.

6. A wireless communication method, comprising:

generating, by a network device, configuration information, wherein the configuration information is used to indicate a plurality of beam sweeping types, wherein the configuration information includes resource set index information, wherein the resource set index information includes a plurality of resource set indexes, and wherein each resource set index of the plurality of resource set indexes corresponds to a beam sweeping type of the plurality of beam sweeping types; and sending, by the network device, the configuration information to a terminal device.

7. The method according to claim 6, wherein:

the method further comprises sending, by the network device, information about correspondences between the plurality of resource set indexes and the plurality of beam sweeping types to the terminal device; or the information about the correspondences between the plurality of resource set indexes and the plurality of beam sweeping types is predefined.

8. The method according to claim 6, wherein the configuration information includes at least one type of report content, quasi co-location information, an interleaved frequency division multiple access repetition factor parameter, or a subcarrier spacing parameter.

9. The method according to claim 6, wherein the resource set index information includes two resource set indexes corresponding to two beam sweeping types, and wherein the configuration information further includes a time difference between performing the two beam sweeping types.

10. A terminal device, comprising:

a receiver, the receiver configured to receive configuration information from a network device, wherein the configuration information is used to indicate a plurality of beam sweeping types, wherein the configuration information includes resource set index information, wherein the resource set index information includes a plurality of resource set indexes, and wherein each resource set index of the plurality of resource set indexes corresponds to a beam sweeping type of the plurality of beam sweeping types;

at least one processor; and one or more memories coupled to the at least one processor and storing programming instructions for execution by the at least one processor to determine the plurality of beam sweeping types based on the configuration information.

11. The terminal device according to claim 10, wherein the programming instructions are for execution by the at least one processor to:

determine the plurality of beam sweeping types based on the configuration information and information about correspondences between the plurality of resource set indexes and the plurality of beam sweeping types.

12. The terminal device according to claim 11, wherein the information about the correspondences between the plurality of resource set indexes and the plurality of beam sweeping types is received by the receiver from the network device, or the information about the correspondences between the plurality of resource set indexes and the plurality of beam sweeping types is predefined.

13. The terminal device according to claim 10, wherein the configuration information includes at least one type of report content, quasi co-location information, an interleaved frequency division multiple access repetition factor parameter, or a subcarrier spacing parameter.

14. The terminal device according to claim 10, wherein the resource set index information includes two resource set indexes corresponding to two beam sweeping types, and wherein the configuration information further includes a time difference between performing the two beam sweeping types.

15. A network device, comprising:

at least one processor;

one or more memories coupled to the at least one processor and storing programming instructions for execution by the at least one processor to generate configuration information, wherein the configuration information is used to indicate a plurality of beam sweeping types, wherein the configuration information includes resource set index information, wherein the resource set index information includes a plurality of resource set indexes, and wherein each resource set index of the plurality of resource set indexes corresponds to a beam sweeping type of the plurality of beam sweeping types; and a transmitter, configured to send the configuration information to a terminal device.

16. The network device according to claim 15, wherein:

the transmitter is further configured to send information about correspondences between the plurality of resource set indexes and the plurality of beam sweeping types to the terminal device; or the information about the correspondences between the plurality of resource set indexes and the plurality of beam sweeping types is predefined.

17. The network device according to claim 15, wherein the configuration information includes at least one type of report content, quasi co-location information, an interleaved frequency division multiple access repetition factor parameter, or a subcarrier spacing parameter.

18. The network device according to claim 15, wherein the resource set index information includes two resource set indexes corresponding to two beam sweeping types, and wherein the configuration information further includes a time difference between performing the two beam sweeping types.

* * * * *